United States Patent [19]

Orain

[11] Patent Number: 4,881,923
[45] Date of Patent: Nov. 21, 1989

[54] TELESCOPIC TRANSMISSION JOINT, IN PARTICULAR FOR A VEHICLE

[75] Inventor: Michel Orain, Conflans Sainte Honorine, France

[73] Assignee: Glaenzer Spicer, Poissy, France

[21] Appl. No.: 127,504

[22] Filed: Dec. 1, 1987

[30] Foreign Application Priority Data

Dec. 5, 1986 [FR] France .............................. 86 17044

[51] Int. Cl.⁴ .............................................. F16D 3/20
[52] U.S. Cl. ................................... 464/111; 464/120; 464/132; 464/905
[58] Field of Search ............... 464/111, 120, 122, 132, 464/905

[56] References Cited

U.S. PATENT DOCUMENTS 4,167,860  9/1979  Sakaguchi et al. ................. 464/111
4,565,540  1/1986  Orain .................................... 464/111

Primary Examiner—Daniel P. Stodola
Attorney, Agent, or Firm—Wenderoth, Lind & Ponack

[57] ABSTRACT

Arms (2) of a tripod element (1) are in force-transmitting relation in the circumferential direction and in mobile relation in the axial direction, with rolling tracks (9) provided longitudinally inside a bowl (10), through the medium of roller segments (6,6a, 6b). The latter have a toric outer surface (8) in rolling contact with the tracks (9) which have a corresponding transverse radius of curvature, and an inner spherical surface (3) which is in ball-joint relation to spherical regions (3) of the arms (2). When the joint operates in contraction-extension, each roller segment (6) slides around the spherical regions (3) and rolls in the tracks (9) until, in an extreme position, the two roller segments (6a, 6b) associated with each arm abut against each other by their circumferential ends (14). Utilized for reducing the number of component parts of the joint and eliminating friction between points whose relative paths have turning back points.

21 Claims, 7 Drawing Sheets

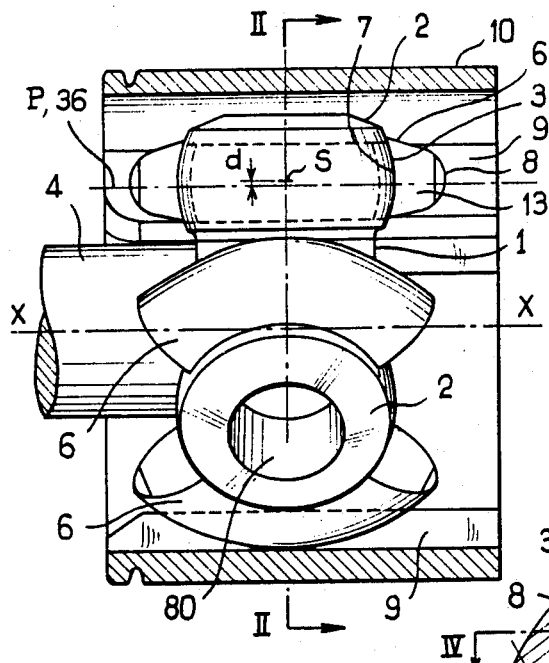
FIG.1
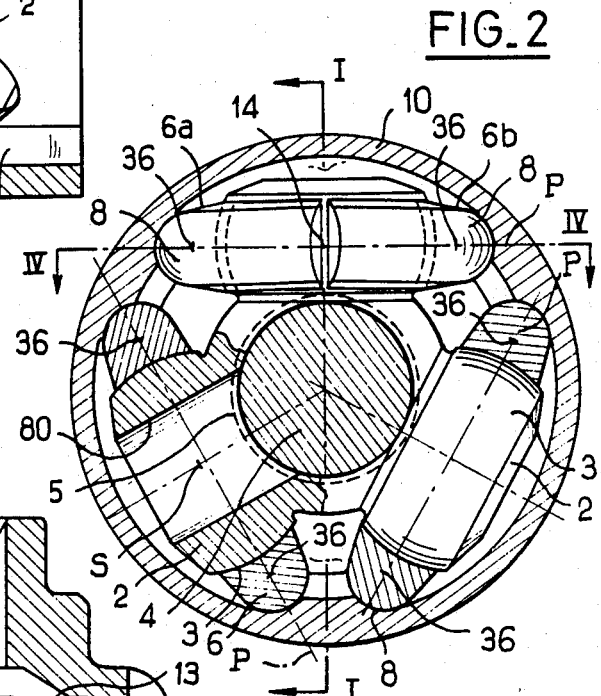
FIG.2
FIG.3
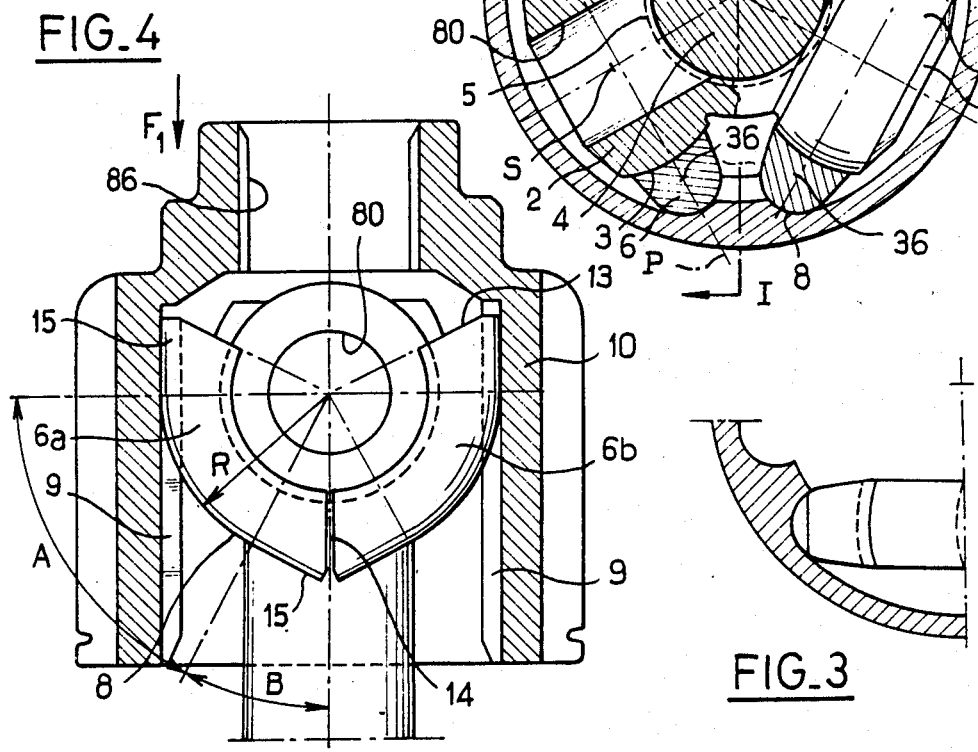
FIG.4

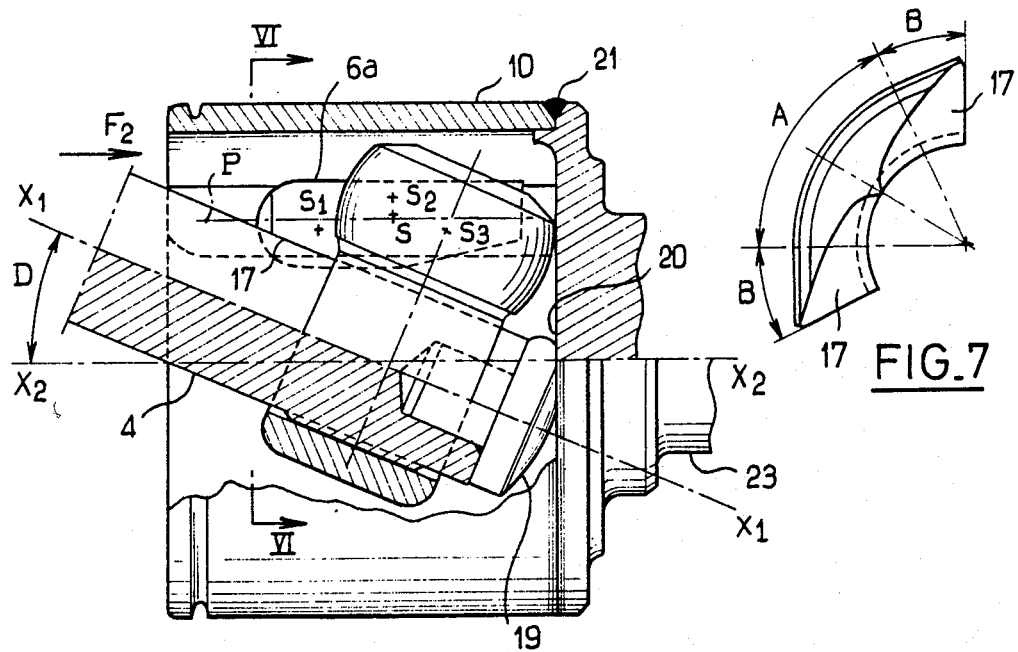
FIG.5
FIG.7
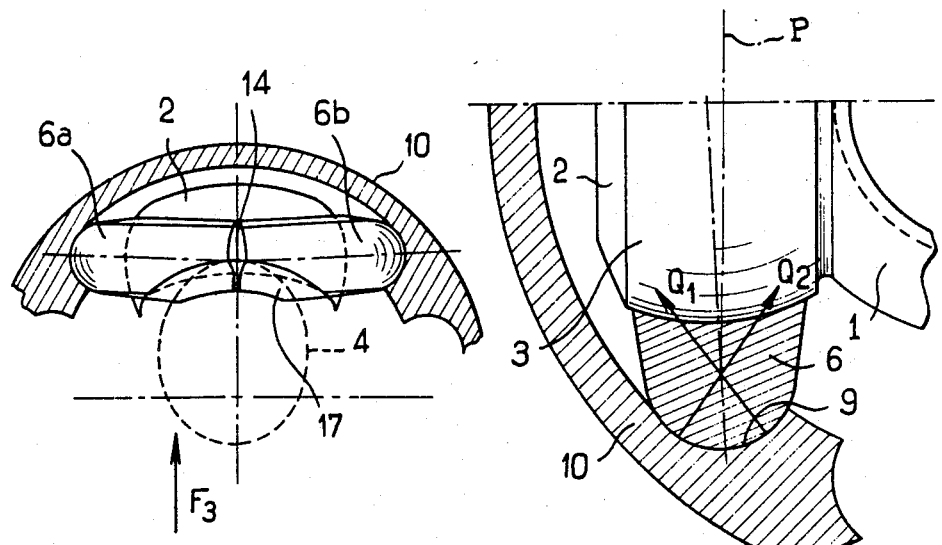
FIG.6
FIG.8

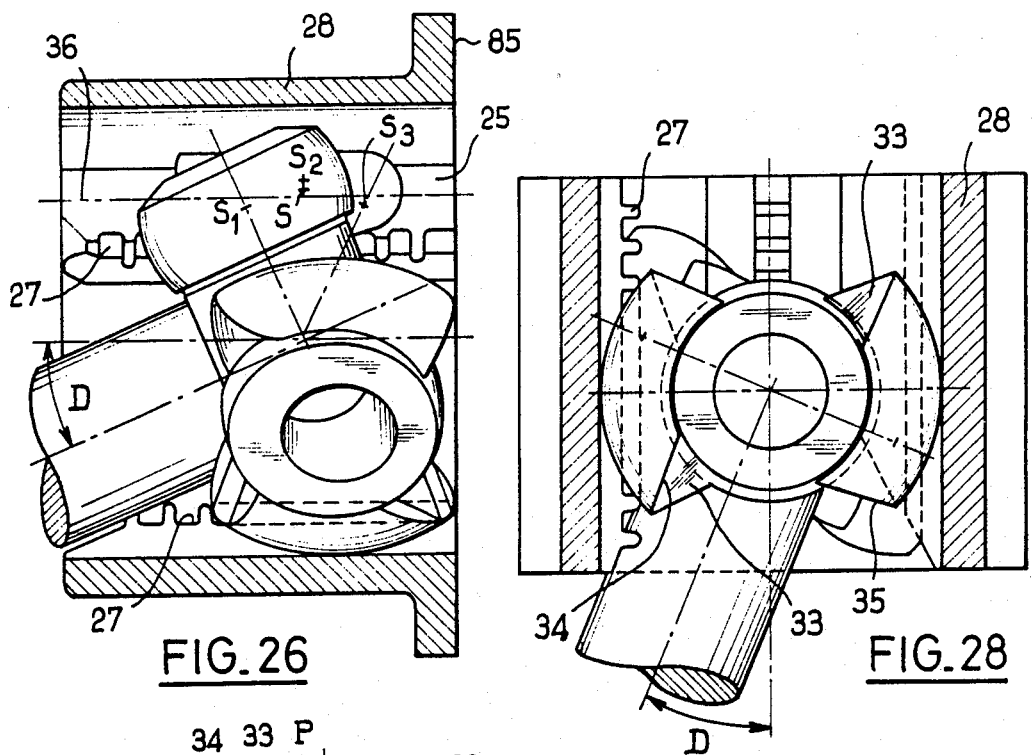
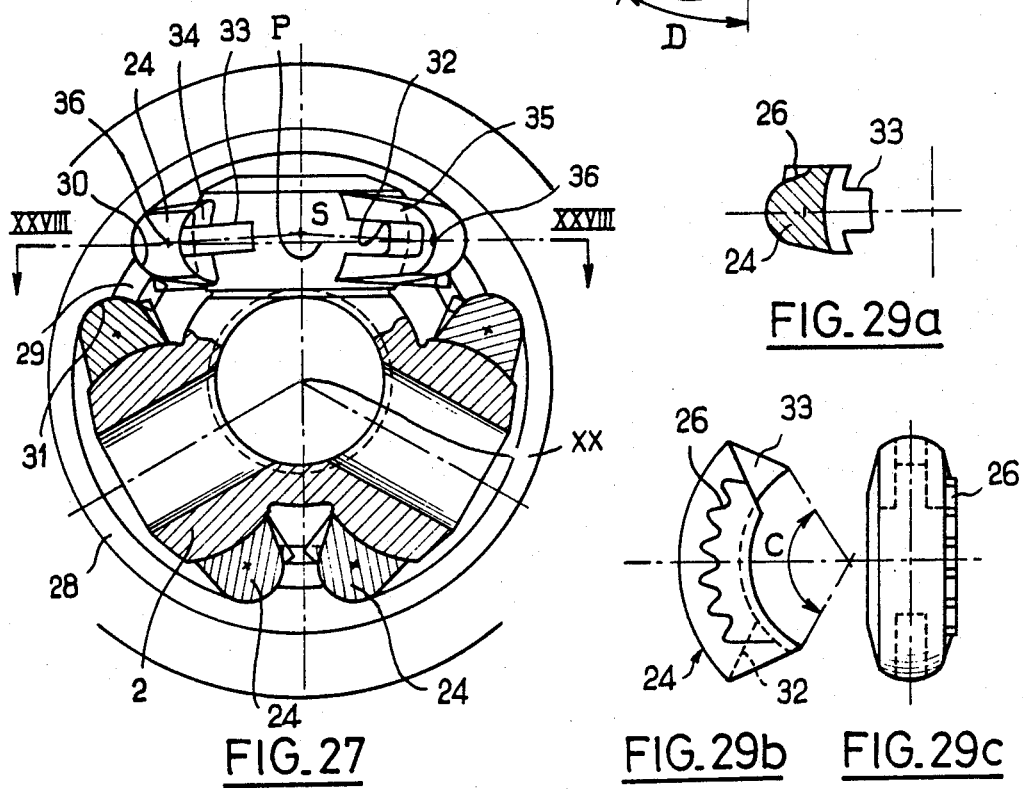

TELESCOPIC TRANSMISSION JOINT, IN PARTICULAR FOR A VEHICLE

BACKGROUND OF THE INVENTION (1) Field of the Invention

The present invention relates to a homokinetic articulated transmission joint, termed a telescopic or sliding joint, of the type employed in lateral or longitudinal transmissions of vehicles having a front wheel drive, or propelled by independent wheels, or having four driving wheels. The present invention concerns more particularly a telescopic transmission joint, in particular for a vehicle, comprising a first element provided with three arms disposed substantially radially relative to its axis and each partly surrounded by two roller segments whose radially outer surfaces, in the form of sections of a torus, are in rolling contact with longitudinal rolling tracks on a second element, which tracks have in cross-section a direction of curvature which is complementary to that of the radially outer surfaces of the roller segments.

(2) Description of the Prior Art

As is known, it is attempted to avoid in automobile vehicles having an internal combustion engine, that the vibrations of the engine be transmitted to the structure and the compartment of the vehicle. In particular, the transmission shafts which transmit the power of the engine to the wheels, and consequently have a notable rigid mass, should in no way transmit vibrations from the engine to the structure through the hubs of the driving wheels.

For an even stronger reason, the operation of these transmission shafts must in no case itself produce vibrations.

There is known from the patent FR-A-2 525 306 a joint of the type indicated at the beginning of the description in which the arms of the first element, namely a tripod element, bear against an inner cylindrical surface of the roller segments through a bush with interposition of needles between the bush and the segment. The bush is in itself free to pivot on the arms of the tripod element about an axis perpendicular to the axis of the tripod element and to the radial direction of the considered arm.

Such a joint is extremely complex. While it certainly minimizes the relative sliding movements between all the pairs of parts, these movements have direction changing points or stoppage points which produce vibrations.

There is also known from the patent FR-A-2 580 751 a joint in which the arms of the first element are shaped in spherical regions in swivelling contact with bars bearing in the rolling tracks through balls mounted in cages. Here again, the number of parts is relatively large and their stacking considerably increases the volume of the barrel, the weight, the cost and the overall size of the joint.

SUMMARY OF THE INVENTION

An object of the invention is to overcome these drawbacks and provide a transmission joint which has a very long life span during which it preserves its qualities of comfort, is light, affords high efficiency, is capable of operating in a hot atmosphere substantially without cooling, for example in proximity to the power unit, the exhaust pipe or a catalytic muffler, is compact to permit its installation in a restricted space, is very reliable without requiring maintenance and is as cheap as possible.

According to the invention, the transmission joint has radial arms having at least one spherical surface in ball-joint contact with a complementary spherical surface of the roller segments with which they are respectively associated, the spherical surfaces and the complementary spherical surfaces being centered at a distance from the axis of the first element.

In the course of the extension-contraction movement, the roller segments roll along the rolling tracks of the second element and slide around the radial arms of the first elements. Upon rotation at an angle, the roller segments roll in a to-and-fro manner in the rolling tracks, as a consequence of the variable position of each arm relative to the axial direction of the second element during a revolution of the joint.

The qualities of comfort of the joint according to the invention are obtained by the elimination of the cyclic frictions during the operation at an angle, since the transfer of the torque between the first and second elements brings into operation two types of articulated connection which are both devoid of cyclic friction at the turning back point.

Indeed, the rolling of the toric surfaces of the segments on the tracks of the second element is a substantially pure rolling for three reasons. Firstly, the axis of the segments is maintained constantly perpendicular to the axis of the rolling tracks and each segment therefore constantly rolls in its natural direction without deviation. Secondly, the value of the hollow, or dip, of the surface of contact between the roller segment and the rolling track is very small compared to the radius of the rolling of the segment. Lastly, the contact pressure (or Hertz) is very low due to the large radius of rolling of the segments.

The absence of cyclic friction at the turning back points is also a result of the fact that the sliding of the inner spherical surfaces of the segments on the spherical regions of the arms of the first element is itself devoid of such frictions, since:

(a) the movement of the spherical region of each arm relative to the roller segment is a continuous ball-joint conical movement. Indeed, the segment permanently maintains an orientation in which its median longitudinal plane is parallel to the axis of the second element, while the spherical region of the arm is related to the first element. In other words, any point of the spherical region of any one of the arms describes a closed curve such as an ellipse on the spherical inner surface of the segment. This curve in no case has a turning back point. Lastly, the resulting reaction on the first element both in translation and in flexion is the sum of the three simultaneous swivellings of the arms which are offset 120° in phase. It is moreover possible to verify that these reactions are perfectly constant and substantially nil.

(b) Bearing in mind the possibilities of having a zero clearance or even a theoretical interference between the spherical surface of the segments and the spherical regions of the arms, a sliding without contact occurs with interposition of an extremely thin film of lubricant which is therefore extremely strong. The zero clearance is itself permitted by the articulation having spherical segments since it would obviously be impossible to mount conventional rollers on the trunnions without clearance. The mounting with interference would be even more improbable. Lastly, the movement of the ball-type type of the articulations of this joint is absolutely propitious to the mutual self-adaptation of the spherical surfaces, similar to a running in. This is the procedure employed for finishing optical lenses.

In conclusion, the absence of cyclic friction affords the required qualities of comfort for the vehicle.

Moreover, as the very low operational drag can be hardly likened to friction, an operation without loss of power and without heating is ensured.

This joint has the greatest capacity of torque transmission for a given overall size compared to other joints known at the present time.

In particular, the number of essential component parts of the joint according to the invention is considerably reduced relative to that of prior constructions. Lightness, cheapness, compactness and strength result.

Further features and advantages of the invention will be apparent from the following description.

BRIEF DESCRIPTION OF THE DRAWINGS

In the accompanying drawings, given by way of non-limiting examples:

FIG. 1 is an elevational view of the joint according to a first embodiment, in position of coaxiality, the second element, or bowl, being shown in section along the line I—I of FIG. 2;

FIG. 2 is a partial cross-sectional view taken on line II—II of FIG. 1;

FIG. 3 is a partial view of the rolling element or roller segment as viewed in the direction of arrow F1 of FIG. 4;

FIG. 4 is an inner plan view, partly in section on line IV—IV of FIG. 2;

FIG. 5 is a view of the joint operating at an angle and in the state of maximum contraction corresponding to this angle, this view being in elevation with a part cut away;

FIG. 6 is a partial sectional view taken on line VI—VI of FIG. 5;

FIG. 7 is a view of the segment in the direction of arrow F3 of FIG. 6;

FIGS. 8 and 9 diagrammatically illustrate in a plane transverse to the axis and respectively in a plane parallel to the axis, the principle of guiding in direction of a segment by its rolling track;

FIG. 26 is an elevational view, with an axial section of the bowl, of another embodiment of the joint which is operating at an angle which is the opposite of that of FIG. 5;

FIG. 27 is a view of the joint of FIG. 26 in its coaxial position, partly in section in a plane passing through the axes of the arms of the tripod element;

FIG. 28 is a plan view of the joint of FIGS. 26 and 27 operating at an angle, the bowl being in section on line XXVIII—XXVIII of FIG. 27;

FIGS. 29a, 29b, 29c represent a segment employing an indexing by teeth of the joint of FIGS. 26 to 28, respectively in cross-section, elevation and in plan;

DETAILED DESCRIPTION OF THE PREFERRED EMBODIMENTS

Figure 9:
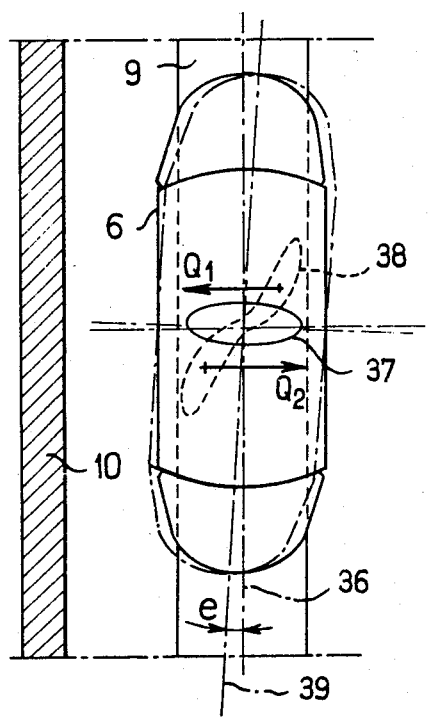

In the embodiment shown in FIG. 1, the transmission joint comprises a first element, or tripod element, having a ring 1 of axis X—X from which radially outwardly extend three radial arms 2 angularly evenly spaced apart about the axis X—X. The lateral wall of each arm 2 is constituted by a convex spherical region 3 whose centre S is located at a distance from the axis X—X and within the arm. This tripod element is fitted on the driving shaft 4 which also has the axis X—X and is secured thereto by welding, friction, splines 5 or by any other known means or by means which will be described hereinafter;

Each arm 2 of the tripod element is partly surrounded by two rolling elements—or roller segments—6, of which a concave radially inner spherical surface 7 (relative to the axis of the arm) is in ball-joint contact with the spherical region 3 of the arm. The radii of curvautre of the spherical regions of the arm and of the spherical surfaces of the roller segments are equal.

The roller segments 6 moreover include a toric radially outer surface (relative to the axis of the arm) 8 by which they are each in contact with a respective one of six rolling tracks 9 provided inside a second element —or bowl—10, whose fastening to the second shaft of the joint is not shown in FIG. 1.

The rolling tracks 9 extend in a direction parallel to the axis of the bowl 10 and of the second shaft of the joint, which axis is the axis X—X of FIG. 1 when the joint is in its coaxial position.

The toric surfaces 8 of the segments have a circular transverse profile and the rolling tracks 9 have a circular profile of the same radius.

Thus, the joint according to the invention comprises basically nine component parts: six rolling bodies, the bowl, the tripod element, and the shaft carrying the latter. Each roller segment is in ball-joint association with one of the arms and rolling association with one of the rolling tracks. The axis of the toric surface of each roller segment passes through the centre S of its spherical surface which itself coincides with the centre S of the spherical region of the associated tripod arm.

When the joint operates in contraction-extension, the roller segments slide on the spherical regions of the arms and roll in their respective rolling track. This will be better understood by comparing the positions shown in FIGS. 1 and 4. In FIG. 1, the joint is in the position of medium extension, and the roller elements are substantially diametrically opposed around each arm. In FIG. 4 and also in the situation shown at the top of FIG. 2, the joint is in the position of maximum contraction and the roller segments, carrying reference numerals 6a and 6b in this position, associated with the same arm of the tripod element, are in contact at 14 by their circumferential ends located on the same side.

In the configuration at an angle (FIG. 5), the arms of the tripod element swivel in the spherical surfaces of the roller elements whose longitudinal median plane remains parallel to the axis of the rolling tracks.

Indeed, if the plane of symmetry 39 of the segment (FIGS. 8 and 9) is slightly inclined, for example at an angle e relative to the axis 36 of the rolling tracks the contact ellipse 37 is greatly altered and assumes the shape of a helix 38 which produces an alignment-correcting torque applied to the segment until the elimination of the angle e and the return to the contact ellipse 37.

This alignment torque is diagrammatically represented in FIGS. 8 and 9 by the two forces $Q_1$ and $Q_2$ which are inclined toward the plane of symmetry of the segment (FIG. 8) and moved away from the pivot axis (FIG. 9). These forces are the resultant of the pressure exerted on the two wings of the contact surface 38 corresponding to an alteration of direction e. The value of e is greatly exaggerated in these Figures in order to render the description more clear.

Thus, in all circumstances, the circumference of the centres of the circular cross-sections of the toric surface remain substantially tangent to the axis 36 of the rolling track and even to a plane P passing through the axes of the two rolling tracks associated with the considered arm of the tripod element.

Figure 10:
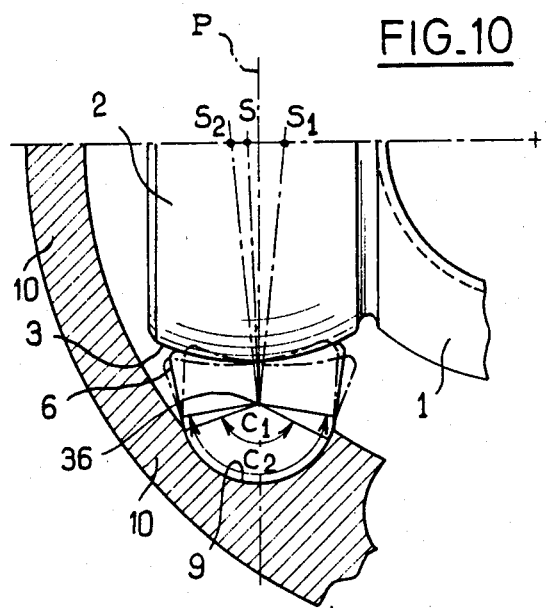
FIG. 10 gives a picture, in a plane transverse to the axis of the movement of lateral inclination of the segment bearing against its rolling track.

Returning to FIG. 5, it will be understood that, when the joint operates at an angle, the arms 2 cyclically move toward and away from an end wall 20 welded at 21 to the bowl 10, at the rhythm of the rotation. This results in an oscillating movement of the roller segments 6 when rolling along the tracks 9. In the course of the aforementioned cyclic movement of the arms of tripod element, the centre of the spherical region 3 of these arms travels relative to the bowl 10 in a curved path illustrated by the points S1, S2, S3 along which the distance between said centre and the axis $X_2$—$X_2$ of the bowl varies. As illustrated in FIG. 10, this causes the roller segments 6 to assume a lateral inclination which varies cyclically by rotation about the axis 36 of the rolling track.

To permit this lateral inclination, the enveloping angle $C_1$ of the rolling track is less than the angle $C_2$ within which the transverse profile of the toric region of the segment is inscribed.

The position of each segment is defined at each instant, on one hand by the coincidence of the centre of its concave spherical surface with the position such as S1, S2, S3 of the centre of the convex spherical region of the associated arm, and, on the other hand, by the tangency of the circumference of the centres of the cross-sections of its toric surface with the axis 36 of the associated rolling track.

As shown in FIG. 1, when the joint is in its position of coaxiality between the shafts, the centre S of the spherical region of each arm of the tripod element is offset relative to the axis X—X radially outwardly of the plane P a distance d preferably between 0.5 and 1 mm. This feature favours the situation in which, when operating at an angle (FIG. 5), the end positions S1, S2, S3 assumed by the centre of the spherical region of each arm are located on each side of the plane P at substantially equal distances from the latter. Due to this arrangement, when operating at an angle, each roller segment 6 (FIG. 10) assumes alternately on each side of the plane P substantially equal angles of inclination.

In an improvement which is used in the embodiment shown in FIGS. 1 to 11, the toric surface 8 of the roller segments is extended at each of its circumferential ends by a tangent cylindrical surface 15 having the same transverse profile as the toric surface. At the end of rotation, this cylindrical surface comes to bear against and slide along the rolling track 9 the shape of which it matches. This increases the effective extension-contraction travel of the joint.

The sum of the angle at the centre A of the toric surface 8 (FIG. 4) and the angle at the centre B of the cylindrical surface 15 may be equal to 90° or larger or smaller depending on the desired compromise.

To explain this, it must first of all be mentioned that, according to FIGS. 2 and 5, in the positions of large contraction, the possibility of the shaft to be to be inclined is limited by the presence of the contiguous ends of the roller segments.

When the sum of the angles A and B is less than 90°, the circumferential ends 13 of the roller elements cannot come into mutual contact. In other words, the region of the segments which would have limited the angle of inclination of the shaft the most is eliminated.

When this sum is larger than 90°, the roller segment under load urges back at the end of the travel by its circumferential end 13 the unloaded roller segment and in this way larger rolling travels without sliding are achieved. The maximum pure rolling travel is equal to the perimeter of the toric region namely: A.R.

The angle B is chosen to be greater than 10° in order to ensure at the end of the rotation an excellent sliding of the cylindrical surfaces 15 against the tracks 9 with no risk of jamming. This sliding advantageously increases the length of the sliding of the joint in the event of an exceptional need or for taking up positioning tolerances between wheels and power units when assembling the vehicle on mass-production lines.

When the joint is operating at a maximum angle D (FIG. 5) between the axis X1—X1 of the tripod element and the axis X2—X2 of the bowl, the shaft 4 and the segment 6 can assume the position indicated in FIGS. 5 and 6. To permit this position corresponding to an interference between the shaft 4 and the theoretical torus carrying the two toric surfaces 8 of the segments, the latter each carry, at their ends which become contiguous when the associated arm is in the neighbourhood of the end wall 20, a chamfer 17 (FIG. 7) whose surface is constituted by the theoretical envelope of the shaft 4 during the rotation of the joint at maximum angle. This chamfer 17 has not been shown in FIGS. 1, 2 and 4 for reasons of simplification.

When the joint operates at an angle and with a large contraction, the roller segments 6a and 6b associated with the arm of the tripod element the closest to the wall 20 retract toward the entrance of the bowl relative to this arm and permit the maximum contraction travel of the joint which is limited by an elastically yieldable stop 19 (shown solely in FIG. 5) fitted in the end of the shaft 4 for bearing against the end wall 20. The latter carries a stub-axle 23 which is partly shown and ensures the transmission of the torque according to a known technique.

Figure 11:
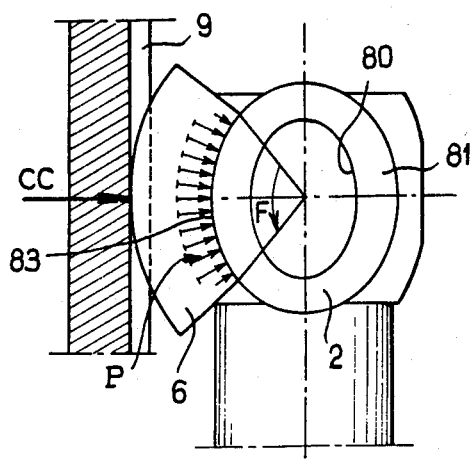
FIG. 11 is a diagrammatic view of the transfer of the force CC to the arm of the tripod element and the elastic deformations (very exaggerated) of the segment and the arm.

A bore 80 radially extends through the tripod element in each of its arms 2 (FIGS. 1, 2 and 11), which imparts to the wall B1 of the arms an elastic deformation capability (ovalization) under the effect of the pressure p transferred through the segment 6 (diagrammatically shown in FIG. 11). This bore 80 is so dimensioned that the equatorial and meridian radii of curvature of the spherical region of the arm substantially correspond to the increase in the facing radii of curvature on the concave spherical surface of the roller segment when it is subjected to a concentric load CC on the part of the rolling track 9.

There is achieved in this way a distribution of pressure p which is substantially uniform throughout the length of an arc F and throughout the width of the spherical surface of the segment in a manner substantially independent of the torque transmitted by the joint.

This distribution of pressure greatly favours the establishment and maintenance of a film of lubricant between the two spherical surfaces and increases the life and efficiency of the joint and eliminates heating.

There will now be described with reference to FIGS. 12 to 19 various embodiments of an anti-dislocation device adaptable to the joint shown in FIGS. 1 to 11. The anti-dislocation device avoids the separation of the tripod element and the segments from the bowl upon an exaggerated extension of the shaft.

Figure 12:
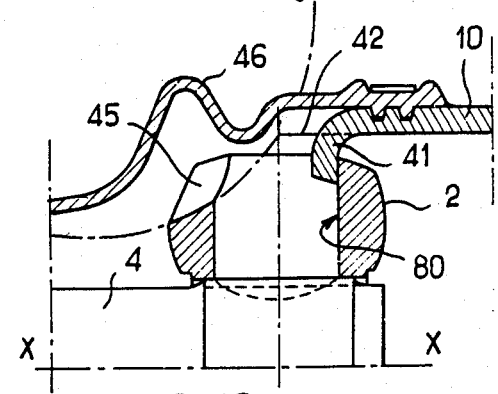
FIG. 12 is a partial sectional view taken on line XII—XII of FIG. 13 of a joint according to the invention provided with an anti-dislocation device.
Figure 13:
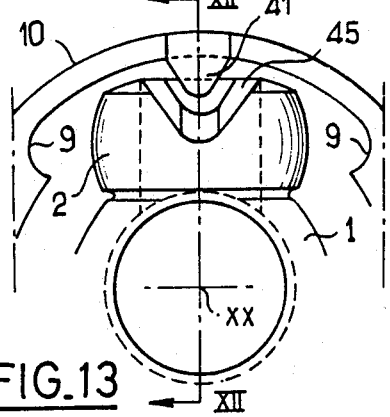
FIG. 13 is a partial front elevational view of the joint of FIG. 12 from the bellows side but in the absence of the latter.
Figure 14:
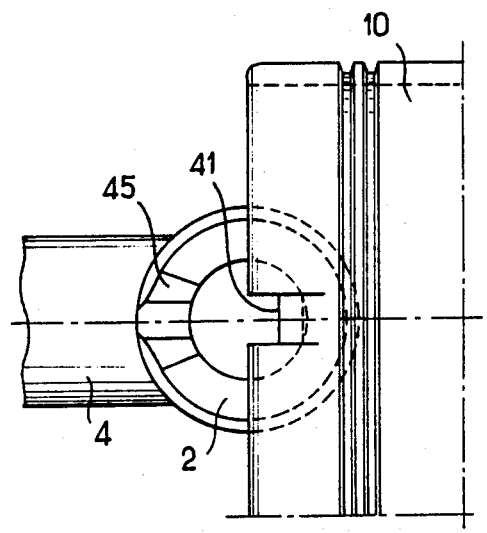
FIG. 14 is a partial plan view of the joint of FIG. 12.

In the embodiment shown in FIGS. 12 to 14, the bowl 10 has a formed-over edge 41 on a notch 42 of the free edge of the bowl which abuts against the inner bore 80 of one of the arms 2. Two other formed-over edges 41 (not shown) are also provided on the edge of the bowl for cooperation with the other two arms 2 of the tripod element. The arms 2 include in their free edges adjacent to the exterior of the bowl a notch 45 which enables the formed-over edge 41 to enter the bore 80 when the joint is extended to its limit position (FIG. 12).

This device prevents in particular the dislocation during the handling and the assembling on a production line of joints assembled on the transmission shafts when the mechanism is filled with grease and closed by a flexible bellows 46.

Figure 15:
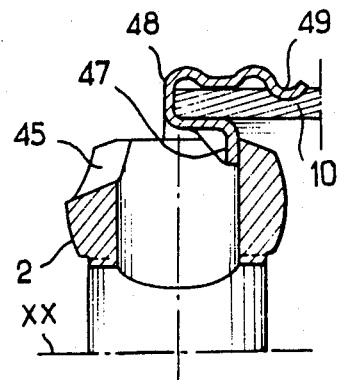
FIGS. 15, 17 and 18 are three views similar to FIG. 12, but concerning three other embodiments of the anti-dislocation device.
Figure 16:
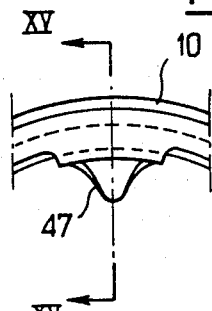
FIGS. 16 and 19 are partial front elevational views of the bowl of the joints of FIGS. 15 and 18 respectively.

In the embodiment shown in FIGS. 15 and 16, the abutment is ensured by three projections 47 formed on the edge of a sheet metal cap 48 set into a groove 49 in the bowl. These projections retain each of the arms of the tripod element as in the preceding version.

Figure 17:
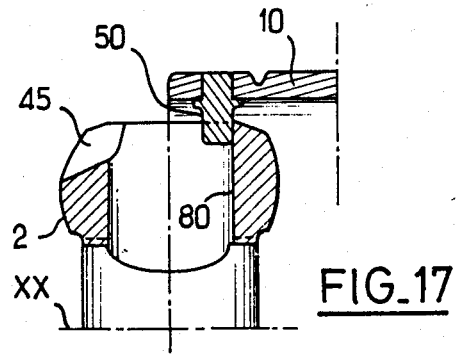

In the embodiment shown in FIG. 17, a pin 50 which is a drive fit in the wall of the bowl and riveted or welded externally, inwardly projects into the bowl in the vicinity of its free edge and thus provides a stop for each arm 2 of the tripod element inside the bore 80.

Figure 18:
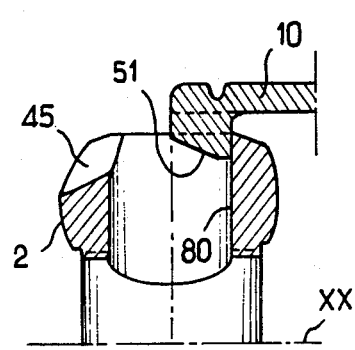
Figure 19:
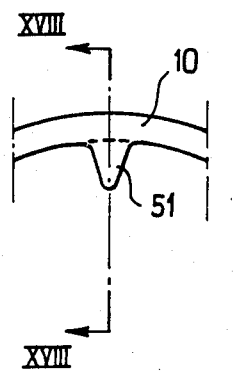
Figure 20:
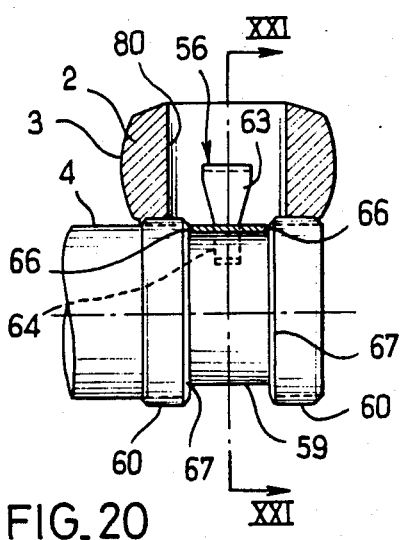
FIG. 20 is a partial view of the association between the shaft and tripod element in any one of the preceding embodiments, with a sectional view of the tripod element taken in the plane XX—XX of FIG. 21.
Figure 21:
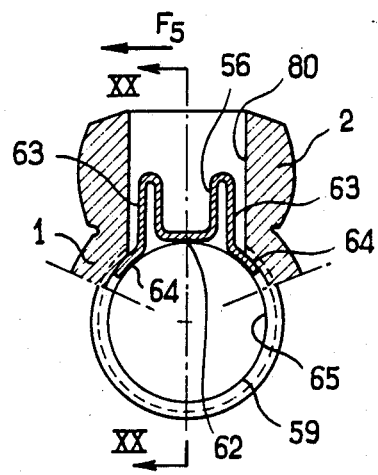
FIG. 21 is a sectional view of the association of FIG. 20 taken on line XXI—XXI of FIG. 20.
Figure 22:
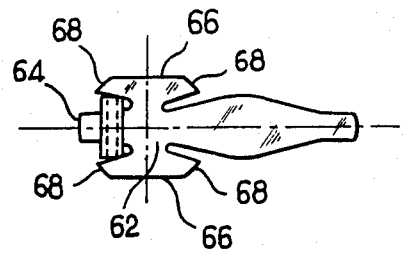
FIG. 22 is a view of the association clip of FIGS. 20 and 21 in the free state in its left part, the right part representing the contour of the sheet metal blank before bending.

In the embodiment in FIGS. 18 and 19, the inner wall of the bowl 10 has in the vicinity of its free edge three shaped bosses 51 which retain the tripod element in the same way as in the preceding embodiments.

There will now be described with reference to FIGS. 20 to 25 two embodiments of a device for the axial and circumferential retention of the tripod element on the shaft 4. This device is also applicable to the joint described with reference to FIGS. 1 to 11.

In the two embodiments, the shaft is laterally hollowed out between two splined annular regions 60 by a cylindrical turning or groove 59 having a diameter less than that of the end of the splines. The ring 1 of the tripod element is splined in a corresponding manner and fitted on the two splined regions 60, which ensures the driving connection.

A clip 56 of bent and hardened sheet metal having the characteristics of a spring is inserted in the bore 80 of each arm of the tripod element. The clip 56 has two opposed rectilinear edges 66 each of which terminates in two edges in the shape of arcs of a circle 68. The four arcs of the circle pertain to the same theoretical circle having the same radius as the bore 80 of the arms 2. The edges 66 are disposed symmetrically relative to the centre of this circle and their mutual distance apart is equal to that of the distance between sides 67 of the turning 59. In the mounted state, the edges 66 fit between the sides 67 of the turning and the edges 68 are fitted in the bore 80 and thus center the clip in the bore.

A centre region 62 (FIG. 22) of the clip interconnects two lateral wings each having an edge 66 and two edges 68. Between these two lateral wings, the centre region 62 carries two locking wings 63 adapted to retain the clip against the shaft 4 in opposition to any centrifugal displacement. Beyond the region 62, each wing 63 is bent toward the opening of the bore 80 and then bent into a hairpin shape toward the shaft 4 and terminates in a tab 64 bent in the opposite direction to the region 62 so as to be capable of engaging in retaining cavities between the cylindrical surface of the turning 59 and the bore of the ring 1 of the tripod element.

The tripod element is in this way very effectively locked onto the shaft by means of a cheap clip easy to mount and remove by compressing the locking wings 63 toward each other.

Figure 23:
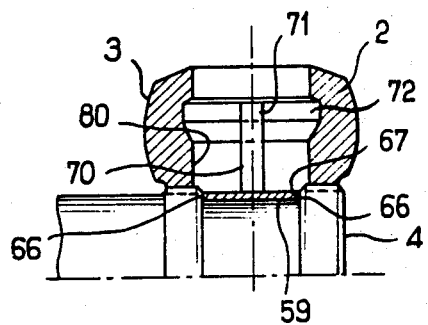
FIGS. 23 to 25 respectively correspond to FIGS. 20 to 22 and show another manner of associating the shaft and tripod element.
Figure 24:
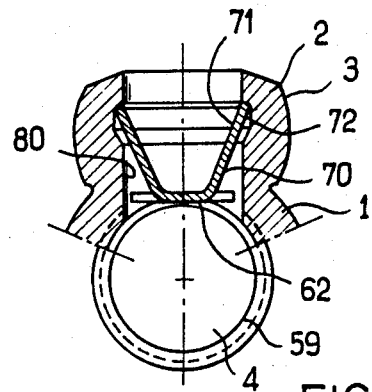
Figure 25:
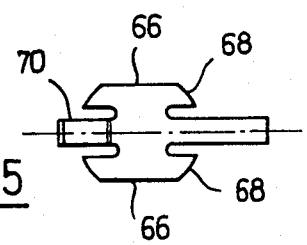

In the embodiment shown in FIGS. 23 to 25, only the locking wings 70 are modified. These have, when considered together, a V-shaped configuration the free ends 71 of which are engaged in a peripheral groove 72 in the bore 80.

FIGS. 26 to 28, 29a, 29b and 29c represent another embodiment in which the rolling movement, and in particular the oscillating movement of the segments 24 accompanying the operation of the joint rotating at an operating angle D is indexed relative to the rolling tracks 25. For this purpose, the segments (FIGS. 29a, 29b, 29c) carry laterally on one side a toothed sector 26 advantageously formed when cold forming the segment. This toothed sector engages with a rack 27, advantageously machined by turning inside the bowl 28, on the crests of three edges 29 (FIG. 27) separating the contiguous rolling tracks such as 30 and 31, located between two arms in such manner that each one cooperates with one thereof.

The racks may be machined as an inner screw thread which results in a slight inclination of the teeth flanks, but also in a cheaper construction.

The corresponding circumferential ends of the segments of each pair cooperating with the same arm are, in the vicinity of their spherical surface, shouldered in a complementary mortice 32 and tenon 33 arrangement (FIGS. 27 and 28) so as to increase the angular envelopment C of their spherical inner surface (FIG. 29b) around the spherical region of the arm of the tripod element and thus avoid the dislocation of the segments at the end of the oscillation while ensuring the maximum length of the rolling. Thus, at the end of the extension-contraction travel of the joint, the tenon 33 of one segment end is fitted with clearance between the flanks of the mortice 32 until there is a contact between the edges 34 and 35 located on each side of the tenon and the mortice respectively. The straight tenon fit may be replaced by V-shaped assembly which would perform the same function and may be preferred for reasons of economy.

The racks 27 and toothed sectors 26 have a sufficient mutual clearance to permit the movements of lateral inclination of the roller segments.

In the embodiments described up to this point, it has been considered that the transverse profile of the toric surface of the segments was convex and that the transverse profile of the rolling tracks was concave.

Figure 30:
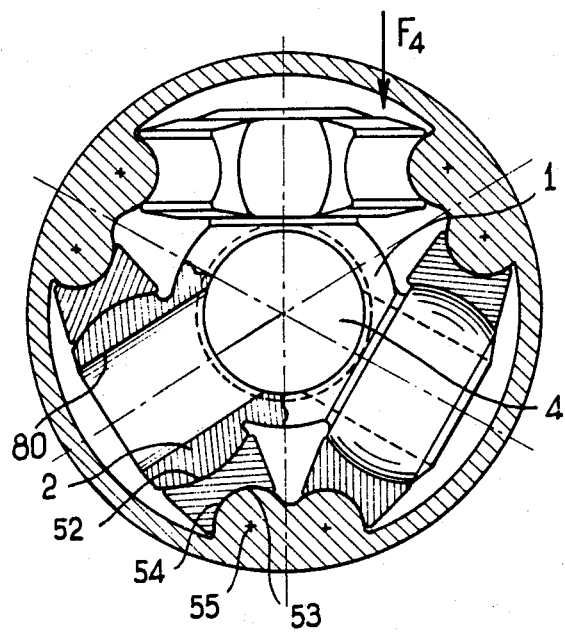
FIG. 30 represents another embodiment of the joint, in a view similar to that of FIG. 2 but in a position of moderate extension.
Figure 31:
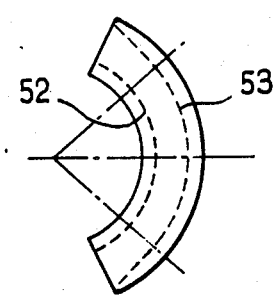
FIG. 31 is a view of a roller segment in a direction of arrow F4 of FIG. 30, and FIGS. 32 and 33 represent examples of lubricating grooves respectively in the spherical surfaces of the segment and tripod element.

The embodiment shown in FIGS. 30 and 31 differs from the preceding embodiments in respect of the profiles of the toric surfaces of the roller segments and of the rolling tracks of the bowl. Indeed, the outer toric surface 53 of the roller segments is in the shape of a trough. Its cross section is concave and substantially circular, while the cross section of the rolling tracks 54 is convex and substantially circular. The cross section of the toric surfaces has a radius equal to or slightly larger than that of the rolling tracks 54 of the bowl. The point of lateral inclination rotation of the segment relative to the bowl is therefore located at 55 on the axis of the cylindrical rolling tracks.

This joint is articulated and operates at an angle in the same way as the joint shown in FIGS. 1 to 11.

The anti-dislocation, indexing, segment rotation limiting and tripod element fixing devices described before are also applicable to this embodiment.

Figure 32:
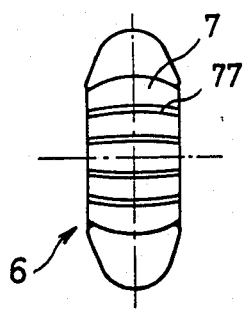

In the embodiment shown in FIG. 32, a roller segment 6 is provided whose inner spherical surface 7 has a plurality of lubricating grooves 77 which are machined or stamped before the heat treatment of the segment. The direction of these grooves is advantageously perpendicular to the longitudinal plane of symmetry of the segment. Their width is on the order of 1 to 2 mm and their depth 0.5 to 1 mm for passenger car joints.

Figure 33:
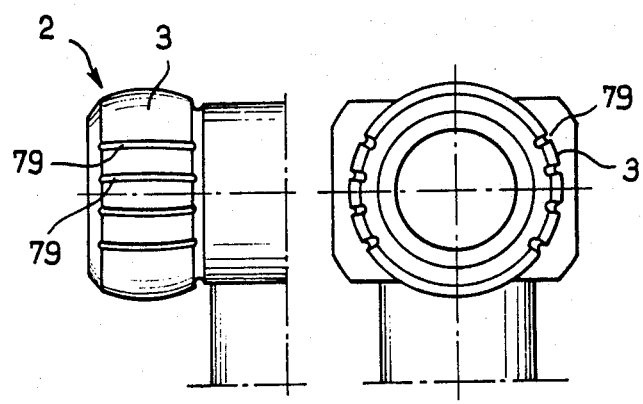

Alternatively, (FIG. 33) lubricating grooves 79 are provided in the continuously loaded region of the spherical region 3 of the arms of the tripod element. These grooves are advantageously oriented in planes passing through the axis of the considered arm.

As will be understood, it is unnecessary, and even disadvantageous, to provide grooves both on the spherical surfaces of the segments and on the spherical regions of the arms of the tripod element.

These lubricating grooves on the segments or on the spherical regions, which extend in a direction perpendicular to the mean direction of sliding, greatly facilitate the mutual self-adaptation of the spherical surfaces and the creation and maintenance of the film of lubricant. Due to the presence of this film, the drag force hardly exceeds that of a ball or needle bearing.

This joint accepts all the known modes of fastening the bowl to the driving elements and for example:
a flange 85 (FIGS. 26 and 27);
an internally splined end 86 (FIG. 4);
a stub-axle 23 (FIG. 5) which is welded or in one piece with the bowl.

Apart from the technical effects indicated at the beginning, the joint according to the invention has the following further advantages:

The diametrical overall size is very small relative to the area of the spherical regions, to the radius of the rolling of the roller segments, the various component parts of the joint being inscribed in a very compact manner within the bowl with a minimum of unoccupied space.

The axial overall size is also small due to the withdrawal of the segments toward the opening of the bowl relative to the tripod element in its extreme contraction position (FIG. 4) and due to the possibility, in the extreme extension position, of bringing the tripod element up to the edge of the bowl. The result of these two advantages is that the bowl may be substantially shortened and the area of the sliding/angularity diagram is more interesting than that of joints known up to the present time.

Moreover, the structural strength of the joint is very high for a given diameter. This advantage results from the sturdy character and the small number of the component parts and from the total isostaticity of the articulated connections which ensures an equal load distribution between the three arms of the tripod element independently of the machining variations.

The mass-production cost is very moderate. Indeed, the number of component parts is small. Due to the isostaticity, the joint is hardly sensitive to machining variations and accepts relatively wide tolerances, particularly in the construction of the bowl which may be extruded with its rolling tracks in the finished condition. The segments may be cold-formed provided their spherical surface is ground after heat treatment. The spherical regions of the tripod element may be produced by a direct grinding of a diecast or forged blank.

The scope of the invention is not intended to be limited to the described and illustrated embodiments.

Thus, the indexation teeth and/or the tenon-mortice systems of the roller segments of FIGS. 26 to 28 may be applied to the other described embodiments.

What is claimed is:

1. A telescopic transmission joint, in particular for a vehicle, comprising a first element having an axis of rotation and provided with three arms disposed substantially radially relative to said axis, a second element having an axis of rotation and carrying longitudinally extending rolling tracks, two roller segments which partly surround each arm having radially outer surfaces in the shape of sections of a torus, are in rolling contact with the longitudinal rolling tracks of the second element, which tracks have a cross section whose direction of curvature is complementary to the direction of curvature of the radially outer surfaces of the roller segments, the radial arms including at least one spherical surface, the roller segments defining a spherical surface which are complementary to the spherical surface of the arm with which they are respectively associated, said spherical surfaces and said complementary spherical surfaces being centered at a distance from said axis of the first element.

2. A transmission joint according to claim 1, wherein the first element is an inner element and the second element an outer element surrounding the first element.

3. A transmission joint according to claim 1, wherein the rolling tracks and the radially outer surfaces of the roller segments have substantially circular cross sections of substantially the same radius.

4. A transmission joint according to claim 3, wherein when the first and second elements are coaxial, the spherical surfaces of the arms have centres which are spaced slightly further away from the common axis of the first and second elements than planes each passing through two axes of two rolling tracks associated with the same arm.

5. A transmission joint according to claim 4, wherein the spherical surfaces of the arms have centres which are about 0.5 to 1 mm further away from the common axis than said planes.

6. A transmission joint according to claim 1, wherein the second element defines along the rolling tracks indexation racks and the roller segments carry indexation teeth cooperative with the racks so as to prevent any substantial sliding of the roller segments along the rolling tracks.

7. A transmission joint according to claim 1, wherein the radially outer surfaces of the roller segments include in the vicinity of at least one of circumferential ends thereof stops for limiting the rolling movement of the roller segments and sliding along the rolling tracks.

8. A transmission joint according to claim 7, wherein the stops are formed by cylindrical regions extending the surfaces in the shape of a section of a torus.

9. A transmission joint according to claim 1, wherein the two roller segments associated with each arm have circumferential ends which are shaped, at least in the vicinity of the spherical surface of the arms, in a complementary manner so as to be capable of interpenetrating when the first and second elements are in the vicinity of an extreme relative axial position.

10. A transmission joint according to claim 1, wherein the spherical surfaces of the arms have a radius equal to the radius of the complementary spherical surfaces of the roller segments.

11. A transmission joint according to claim 1, wherein the spherical surfaces of the arms and the complementary spherical surfaces of the roller segments are concave spherical surfaces cooperative with convex spherical surfaces which have a radius slightly greater than that of the concave spherical surfaces.

12. A transmission joint according to claim 1, comprising in the spherical surfaces of the roller segments lubricating grooves oriented in meridian planes of the spherical surfaces.

13. A transmission joint according to claim 1, comprising in the spherical surface of each arm lubricating grooves oriented in planes passing through the axis of the respective arm.

14. A transmission joint according to claim 1, wherein the second element has a free end and stop means machined, formed or fitted on the free end of the second element for limiting an extension of the joint in the axial direction.

15. A transmission joint according to claim 1, wherein the arms are bored in a radial direction relative to said axis of the first element.

16. A transmission joint according to claim 1, wherein each of the roller segments has a chamfer on its inner face which is radially facing the axis of the second element and in the vicinity of an end thereof generally directed toward the free end of the second element.

17. A transmission joint according to claim 1, wherein each of the longitudinally extending rolling tracks of the second element is formed by a surface which extends in a direction which is substantially parallel to an axis of rotation of the second element.

18. A transmission joint in particular for a vehicle, comprising a first element having an axis of rotation and provided with three arms disposed substantially radially relative to said axis, a second element having an axis of rotation and carrying longitudinally extending rolling tracks, two roller segments which partly surround each arm having radially outer surfaces in the shape of sections of a torus, are in rolling contact with the longitudinal rolling tracks of the second element, which tracks have a cross section whose direction of curvature is complementary to the direction of curvature of the radially outer surfaces of the roller segments, the radial arms including at least one spherical surface, each of the roller segments defining a spherical surface which is complementary to the spherical surface of the arm with which it is respectively associated, said spherical surfaces and said complementary spherical surfaces being centered at a distance from said axis of the first element, the second element having a free end and stop means machined, formed or fitted on the free end of the second element for limiting an extension of the joint in the axial direction, the stop means cooperating with the arms of the first element which defines a cavity in said arms allowing said arms to travel partly beyond the stop means before the limit axial position of extension of the joint is reached.

19. A transmission joint in particular for a vehicle, comprising a first element having an axis of rotation and provided with three arms disposed substantially radially relative to said axis, a second element having an axis of rotation and carrying longitudinally extending rolling tracks, two roller segments which partly surround each arm having radially outer surfaces in the shape of sections of a torus, are in rolling contact with the longitudinal rolling tracks of the second element, which tracks have a cross section whose direction of curvature is complementary to the direction of curvature of the radially outer surfaces of the roller segments, the radial arms including at least one spherical surface, each of the roller segments defining a spherical surface which is complementary to the spherical surface of the arm with which it is respectively associated, said spherical surfaces and said complementary spherical surfaces being centered at a distance from said axis of the first element, the arms being part of a ring, a shaft is fitted in the ring so that the ring rotates with the shaft, the shaft is laterally hollowed out, radial passages in each arm extend through the ring, and locking elements centered in the passages project into the lateral hollow of the shaft so as to axially position the ring on the shaft, retaining means being provided for retaining the locking elements in the vicinity of the shaft.

20. A transmission joint according to claim 19, comprising retaining cavities communicating with the passages in the arms, the retaining means comprising locking tabs which are an integral part of the locking elements and are removably engaged in the retaining cavities.

21. A transmission joint according to claim 20, wherein the ring has a centre bore and the retaining cavities are defined between the centre bore and the lateral hollow of the shaft.

* * * * *